(12) United States Patent
Zendejas-Martinez

(10) Patent No.: US 9,546,409 B2
(45) Date of Patent: Jan. 17, 2017

(54) PROCESS FOR PRODUCING DIRECT REDUCED IRON (DRI) UTILIZING GASES DERIVED FROM COAL

(75) Inventor: Eugenio Zendejas-Martinez, Nuevo León (MX)

(73) Assignees: HYL TECHNOLOGIES, S.A. DE C.V., Nuevo Leon (MX); DANIELI & C. OFFICINE MECCANICHE, S.P.A., Buttrio, UD (IT)

( * ) Notice: Subject to any disclaimer, the term of this patent is extended or adjusted under 35 U.S.C. 154(b) by 246 days.

(21) Appl. No.: 14/240,013

(22) PCT Filed: Aug. 20, 2011

(86) PCT No.: PCT/IB2011/053667
§ 371 (c)(1),
(2), (4) Date: Jun. 3, 2014

(87) PCT Pub. No.: WO2013/027084
PCT Pub. Date: Feb. 28, 2013

(65) Prior Publication Data
US 2014/0260803 A1    Sep. 18, 2014

(51) Int. Cl.
C21B 13/00    (2006.01)
C21B 13/02    (2006.01)
(Continued)

(52) U.S. Cl.
CPC ............... *C22B 1/11* (2013.01); *C10K 1/004* (2013.01); *C21B 11/02* (2013.01);
(Continued)

(58) Field of Classification Search
CPC .. C21B 13/0073; C21B 13/0033; C21B 13/02; C10K 1/004
See application file for complete search history.

(56) References Cited

U.S. PATENT DOCUMENTS 3,765,872 A    10/1973   Celada et al.
3,779,741 A    12/1973   Celada et al.
(Continued)

FOREIGN PATENT DOCUMENTS

JP          H0569566 B2 * 10/1993
WO      WO 2009037587 A2 *  3/2009

*Primary Examiner* — George Wyszomierski
*Assistant Examiner* — Tima M McGuthry Banks
(74) *Attorney, Agent, or Firm* — Frommer Lawrence & Haug LLP; A. Thomas S. Safford

(57) ABSTRACT

A process for producing DRI from iron ores, utilizing a gas produced from fossil fuels, containing sulfur compounds and BTX, heating said gas in a heater, preferably a regenerator, wherein heat is transferred from a previously-heated solid material to the gas. Flowing the hot gas through a bed of DRI particles, iron oxides or other equivalent material, outside of the reduction reactor, where said material adsorbs sulfur compounds and destroys BTX. The resulting gas, free from sulfur compounds and BTX, is combined with a reducing gas stream from the reduction reactor after $H_2O$ and $CO_2$ is at least partially removed for regenerating its reducing potential, with or without undergoing previous cleaning, is used for producing DRI. One inventive embodiment comprises producing DRI at high temperature giving advantageously higher productivity and energy savings when using hot DRI in an electric arc furnace lowering the capital and operational costs of steelmaking.

28 Claims, 3 Drawing Sheets

(51) Int. Cl.
*C10K 1/00* (2006.01)
*C22B 1/11* (2006.01)
*C21B 11/02* (2006.01)
*C22B 3/02* (2006.01)

(52) U.S. Cl.
CPC ...... *C21B 13/0033* (2013.01); *C21B 13/0073* (2013.01); *C21B 13/02* (2013.01); *C22B 3/02* (2013.01); *C21B 2100/02* (2013.01); *C21B 2100/04* (2013.01); *Y02P 10/122* (2015.11); *Y02P 10/126* (2015.11); *Y02P 10/128* (2015.11); *Y02P 10/136* (2015.11)

(56) References Cited

U.S. PATENT DOCUMENTS

| | | | |
|---|---|---|---|
| 4,150,972 A | 4/1979 | Price-Falcon et al. | |
| 4,173,465 A | 11/1979 | Meissner et al. | |
| 4,235,593 A | 11/1980 | Malone | |
| 4,270,739 A | 6/1981 | Ahrendt et al. | |
| 4,336,063 A | 6/1982 | Guzmán-Bofill et al. | |
| 4,351,513 A | 9/1982 | Sanzenbacher | |
| 4,608,240 A * | 8/1986 | Villarreal-Trevino | C07C 7/14841 423/230 |
| 4,834,792 A | 5/1989 | Becerra-Novoa | |
| 5,078,787 A | 1/1992 | Becerra-Novoa et al. | |
| 5,447,702 A * | 9/1995 | Campbell | B01D 53/52 423/230 |
| 6,149,859 A | 11/2000 | Jahnke et al. | |
| 2002/0078795 A1 | 6/2002 | Shigehisa et al. | |
| 2002/0130448 A1 | 9/2002 | Sherwood | |
| 2006/0027043 A1* | 2/2006 | Zendejas-Martinez | B01D 53/48 75/495 |
| 2009/0211401 A1* | 8/2009 | Zendejas-Martinez | C21B 13/0073 75/443 |
| 2010/0050812 A1 | 3/2010 | Van Heeringen et al. | |
| 2010/0162852 A1* | 7/2010 | Becerra-Novoa | C21B 13/0073 75/433 |

* cited by examiner

PROCESS FOR PRODUCING DIRECT REDUCED IRON (DRI) UTILIZING GASES DERIVED FROM COAL

This application is a National Stage Entry under 35 U.S.C §371 of PCT/IB2011/053667 filed on Aug. 20, 2011, published on Feb. 28, 2013 under publication number WO 2013/027084, the disclosure of which is incorporated herein by reference.

FIELD OF THE INVENTION

The present invention relates to processes and plants for the direct reduction of iron ores, and more particularly to a process for producing direct reduced iron (DRI) utilizing gases derived from coal pyrolysis or from partial combustion of coal, also known as gasification.

BACKGROUND OF THE INVENTION

Several proposals published in the technical literature of the iron and steelmaking industry and in patents can be found about the utilization of gases derived from the pyrolysis or from gasification of coal (coal gas), of which an example is coke oven gas, for producing direct reduced iron, also known in the industry as sponge iron (DRI in English).

DRI is a granular solid material produced by the reaction of particulate iron ores, mainly iron oxides, in the form of lumps, pellets of concentrated ore, or mixtures thereof, with a reducing gas mainly composed of hydrogen and carbon monoxide, at a temperature in the range from about 750° C. to about 1100° C.

Typical DRI plants are shown for example in U.S. Pat. Nos. 3,779,741; 3,765,872; 4,150,972; 4,336,063; 4,834,792; and 5,078,787. These systems commonly comprise vertical shaft reactors having a reduction zone in their upper part and a discharge zone in their lower part.

The reducing gas fed to the reactor at high temperatures is typically mainly composed of hydrogen and carbon monoxide and after reacting with the iron oxides produces water and carbon dioxide.

Chemical reduction of iron oxides is carried out by such reducing gas is typically produced by the reformation or the partial combustion of natural gas;however, there is an increasing interest in utilizing other gases derived from gasification (partial combustion) of solid and liquid fossil fuels, such as coal, among which coke oven gas is included.

Coke oven gas is a by-product of coking of coal. Coke is used in the steel industry as a feedstock for blast furnaces where pig iron is produced. Pig iron is liquid metallic iron used as raw material for steelmaking. Coal is pyrolyzed in coke ovens, i.e. is heated without presence of oxygen whereby the volatile matters contained in coal are evaporated and are thus removed from coal, producing coke.

The gas effluent from coke ovens at a temperature of about 1100° C. passes to a gas purification plant wherein some of the volatile substances are recuperated. This gas is then cooled and the cooled gas, saturated with water at a temperature of about 80° C. is separated from the cooling water which entrains tars and other condensed organic compounds.

Coke oven gas typically has the following composition in volume % on a dry basis:

| | |
|---|---|
| Hydrogen | 55-62% |
| Methane | 22-26% |
| Nitrogen | 8-10% |
| Carbon monoxide | 6-8% |
| Carbon dioxide | 2-3% |
| Hydrocarbons (ethane, propane, etc.) | 2-3% |

Additionally, coke oven gas contains other contaminants and undesired substances, whereby this gas has some special characteristics that condition its utilization, such as:

Tar vapors

Light oils vapors (aromatics) mainly comprising benzene, toluene and xylene, which jointly are known as BTX.

Naphthalene vapors

Ammonia

Hydrogen sulfide $H_2S$

Hydrogen cyanide

The concentration levels of the above-mentioned substances in the available coke oven gas, depends on the cleaning process undergone by the gas effluent from coke ovens.

So that the coke oven gas can be utilized as fuel in the coke ovens or in other processes in a steelmaking plant, the gas must be treated for condensed water and other contaminant substances; remove the tar aerosols for avoiding plugging of pipes and equipment; remove ammonia for avoiding corrosion of pipes and gas-handling equipment; remove naphthalene for avoiding deposits and plugging of pipes due to its condensation; remove light oils if there is interest in recuperating BTX; and remove sulfur compounds, for example hydrogen sulfide and mercaptans, for complying with environmental regulations.

Since coke oven gas is mainly composed of $H_2$ and $CH_4$, it has been proposed to utilize it for chemical reduction of iron ores and obtain metallic iron in solid form for increasing steel production.

However, coke oven gas can not be fed directly to the direct reduction plant if it is not previously treated to clean out those substances which may cause damages to the plant equipment or which are noxious pollutants for the environment.

The cleaning and conditioning process for coke oven gas entails a high cost since it implies installation and operation of several chemical plants for cooling the gas stream effluent from coke ovens and for separation of condensed oils and ammonia as well as removal of sulfur compounds. The normal separation processes for thiophene, mercaptans and other aromatic sulfur compounds requires that these substances be previously transformed into hydrogen sulfide ($H_2S$) which is suitable of being absorbed by chemical solvents. This process however also has a high capital and operating cost which can be avoided or significantly lowered by applying the present invention.

The cost of cleaning coke oven gas, mainly the desulfurization and removal of BTX, can be lowered by the present invention, by synergistically utilizing the coke oven gas in a direct reduction plant, not just as a fuel, but instead make its utilization snore cost effective as a chemical agent.

It has been proposed, for example in U.S. Pat. No. 4,270,739, to have a direct reduction process which utilizes coke oven gas for reduction of iron ores to metallic iron, wherein the coke oven gas is heated in a direct fired heater before being introduced to the upper part of a reduction reactor wherein the sulfur compounds are adsorbed by the iron care particles. The coke oven gas, free of sulfur compounds, is withdrawn from said reactor and is fed to a catalytic reformer wherein the hydrocarbons present in the gas are reformed to $H_2$ and CO and are then fed to a lower zone where the reduction of iron ores to metallic iron is effected at a higher temperature than the temperature in the adsorption zone of the reactor. This process has the disadvantage that the heater used for heating the coke oven gas to a temperature of 700° C. or higher is a direct-fired heater and therefore the sulfur compounds cause corrosion of the heating pipes and the high level of hydrocarbons cause carbon deposits in the heating pipes which entail damages and problems in the operation of the heater. Furthermore this patent proposes that the reactor have two gas distributing plenums: one for distributing the hot coke oven gas in the upper zone of the reactor and another for distributing the hot reducing gas produced in the reformer.

U.S. Pat. No. 4,351,513 discloses a process for utilizing coke oven gas in a direct reduction reactor wherein the iron ore fed to the upper part of the reactor adsorbs sulfur compounds. This patent does not mention removal of BTX and necessarily produces DRI at low temperature, because coke oven gas, after passing through the iron ore bed is extracted from the reduction reactor and fed to its lower part where it is used for cooling the DRI before its discharge from said reactor. The coke oven gas exiting from the lower part of the reactor is cooled and fed to a reformer to reform the hydrocarbons, mainly $CH_4$, to $H_2$ and CO by reaction of the $CH_4$ with $CO_2$ in the presence of a catalyst. The principal object of this process is the desulfurization of coke oven gas before it passes through the catalytic reformer to avoid the catalyst poisoning by sulfur.

U.S. patent application No. 20090211401 describes a direct reduction process utilizing coke oven gas wherein the coke oven gas is mainly fed to the lower part of the reduction reactor wherein it is contacted with high temperature DRI produced in the upper part of the reactor. The DRI is cooled by the coke oven gas stream, and at the same time the DRI adsorbs the BTX and the sulfur compounds present in the coke oven gas; so that the gas withdrawn from the lower part of the reactor is clean of the undesirable contaminants and is driven to the reduction zone located at the upper part of the reactor wherein the reducing agents $H_2$ and CO react with the iron oxides to produce the DRI. This process however cannot be used when high-temperature DRI is to be produced without any cooling; so as to take advantage of the thermal energy of the DRI when charged directly into the electric arc furnace thus achieving important economic advantages through the electric energy savings and by the increase of steel output productivity due to the shortening of the melting time and of the over all steel furnace heat time, in general.

The processes described in the above-cited patents all are limited with respect to the amount of coke oven gas that can be treated with the DRI produced in the reactor, because sulfur trapped in the DRI must afterwards be eliminated or its concentration minimized in the electric arc furnace where said DRI is utilized for steelmaking.

In contrast with the above limitation, applying the present invention a relatively small amount of DRI (or equivalent material) is used because it can become saturated with sulfur and properly disposed of without contamination of the DRI produced in the reactor.

OBJECTS AND SUMMARY OF THE INVENTION

It is therefore an object of the invention to provide a method and apparatus for producing DRI utilizing a gas produced from coal, for example coke oven gas, wherein purification of said gas in respect to elimination of BTX, sulfur compounds and heavy hydrocarbons is carried out without contaminating with such eliminated materials the DRI produced in the reduction reactor.

It is another object of the invention to provide a method and apparatus for producing DRI utilizing a gas produced from coal, for example coke oven gas, where the problems caused by the heavy hydrocarbons that can form carbon deposits and other condensed materials which plug or corrode the heater tubes are eliminated or minimized.

Other objects of the invention will be pointed out later or will be evident from the following description of the invention.

The objects of the present invention are achieved by providing a method and apparatus for producing direct reduced iron (DRI) from particulate iron ores in the form of lumps, pellets or mixtures thereof, utilizing a gas produced from coal, for example coke oven gas, as the reducing agent, in a vertical shaft reactor having a reduction zone in its upper part where the particles of iron ore are caused to react with a reducing gas fed to said reduction zone at a temperature in the range from about 750° C. to 1100° C. The coke oven gas is heated as a first gas stream to a temperature between about 650° C. and 800° C., and this hot coke oven gas is caused to flow through a bed of particles of an adsorbent material outside from said reduction reactor, whereby sulfur compounds and BTX are adsorbed by said adsorbent material and the heavy hydrocarbons are cracked into lighter compounds by contact with said adsorbent material at high temperature. Coke oven gas, free from the sulfur compounds and BTX is combined as a second gas stream with a third gas stream in the form of a reducing gas stream withdrawn from the reduction reactor, from which $H_2O$ and $CO_2$ have at least partially been removed for regenerating its reducing potential, and said combined gas is fed as a fourth gas stream to the reduction zone of the reactor, whereby DRI is produced utilizing coke oven gas with low cleaning capital and operating costs. Preferably the adsorbent material is DRI or an equivalent material.

DETAILED DESCRIPTION OF THE INVENTION

In this specification, some preferred embodiments of the invention have been described with reference to the attached figures which will help to better understand the spirit and scope of the invention. It will be understood that the description of the preferred embodiments is merely illustrative and not limitative and that the invention will be defined by the attached claims.

Although the invention is herein described as applied to the utilization of coke oven gas, it will be evident that it can be applied to the utilization of other gases derived from solid or liquid hydrocarbons, such as coal, which are produced by the partial combustion or gasification of said hydrocarbons and which contain varying proportions of sulfur compounds and aromatic compounds BTX, particularly when the gasification, at least partially, is carried out at temperatures below about 800° C.

Figure 1:
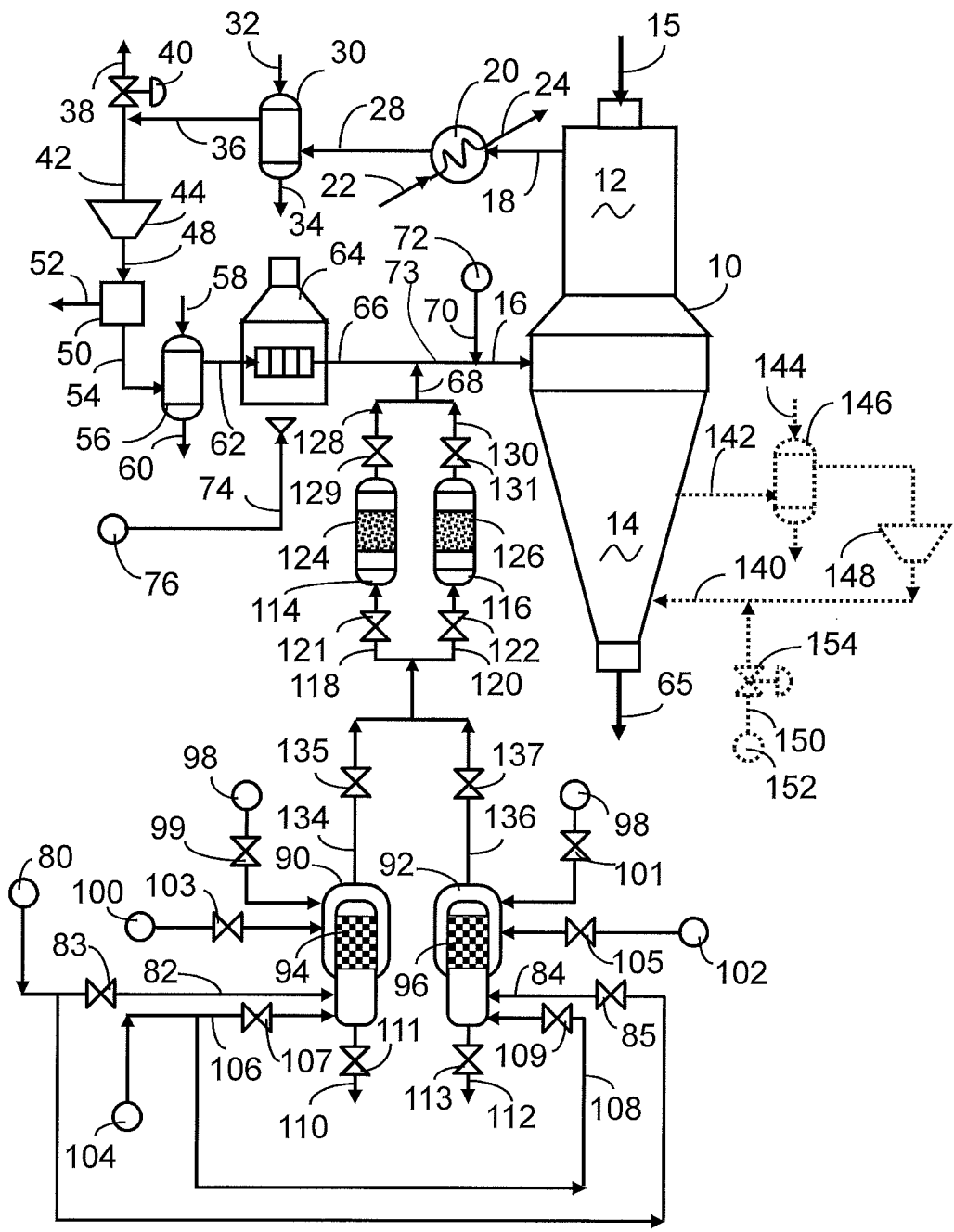
FIG. 1 is a schematic process diagram showing a direct reduction process for producing DRI 65 at high temperature, wherein coke oven gas is utilized according to the invention, that is after sulfur compounds have been adsorbed in a bed of particles of adsorbent material outside of the reactor and the BTX and heavy hydrocarbons have been destroyed avoiding sulfur contamination of the DRI 65 produced in the reactor.

With reference to FIG. 1, numeral 10 generally designates a direct reduction reactor, having a reduction zone 12, through which iron ore particles 15 containing iron oxides flow by gravity at a regulated rate in a manner known in the art. The iron ore particles are into at the upper part of said reduction zone 12 in the form of lumps, pellets or mixtures thereof.

A reducing gas 16, mainly composed of hydrogen and carbon monoxide at a high temperature in the range between about 900° C. and about 1100° C., is introduced into the reduction zone 12 where it is caused to react with the iron oxides converting iron oxides to metallic iron, producing DRI 65 by the following chemical reactions, among others:

$$Fe_xO_y + H_2 \rightarrow Fe° + H_2O \qquad (1)$$

$$Fe_xO_y + CO \rightarrow Fe° + CO_2 \qquad (2)$$

$$H_2O + CO \rightarrow CO_2 + H_2 \qquad (3)$$

Due to the chemical equilibrium of the reduction reactions (1) & (2) and of the gas conversion reaction (3) shown above, the reducing gas effluent 18 exiting from the reduction zone 12 through an outlet therefrom contains hydrogen and carbon monoxide (as well as water and carbon dioxide, which are products of said reduction reactions). In order to increase the efficiency of the process, the reducing potential of the gas effluent 18 from the reactor is increased by removing water and carbon dioxide before recycling the gas thereby enhanced back to the reduction zone. The gas effluent 18 from the reduction zone 12 has a temperature in the range between about 350° C. and about 450° C., depending on the conditions of temperature and pressure of the reduction zone 12, and on the reducibility of the iron ores therein.

The gas withdrawn from reactor 10 through a pipe and on through the tubes of a heat exchanger 20 where the sensible heat of the gas is transferred to water 22 fed through the exchanger 20. The water 22 is heated, and exits as steam 24 from the heat exchanger 20. The steam 24 can be used as a reactant, heat source, or other direct or indirect energy source in the DRI plant, or elsewhere. Specifically, the steam 24 can be used for example in the regeneration process of the solvent utilized for $CO_2$ absorption in the absorption system 50 and can also be added to the coke oven gas for promoting the reformation of its methane content. The sensible heat of the gas effluent 18 from the reduction zone 12 can also be used for pre-heating the recycled reducing gas before it is further heated in heater 64.

The partially cooled reducing gas 28 exiting the heat exchanger 20 through a pipe is further cooled down to ambient temperature in cooler 30 by direct contact with a flow of quench water 32. As a result, water produced by the reduction reactions is condensed. This water condensate is combined with the quench water 32, and the resulting water mixture 34 is removed through an outflow pipe. A small portion 38 of the cooled dewatered gas 36 is purged from the recycle loop of the reduction system through a pipe having a pressure control valve 40. This purged portion 38 serves to prevent build up of $N_2$ etc. in the reactor and recycle gas and can be utilized as fuel in other equipment of the reduction plant For example, in heater 64 it can substitute for at least some of gas stream 98, or it can be used in combination with the fuel gas stream 74 from a suitable source 76, or it can also be used as fuel for pre-heating the refractory material of the regenerative heaters 90 and 92, or in the coke ovens.

The remaining portion 42 of the dewatered gas effluent from the reduction zone 12 flows through a pipe to compressor 44 and then passes as a re-pressurized gas 48 through a pipe to a $CO_2$ separation unit 50, which can be of the type of chemical absorption or of the type of physical adsorption (PSA or VPSA) in a manner known in the art. Unit 50 separates $CO_2$ gas 52 from the recycle gas loop.

The enhanced gas stream 54, having a reduced content of carbon dioxide, exits the $CO_2$ separation unit 50 through a pipe and is fed to a humidifier 56 where it gets saturated with water by contact with water 58, the excess 60 of which exits said humidifier through a discharge pipe. The water-saturated recycle gas 62 is heated in a heater 64 to a temperature in the range from about 720° C. to about 1100° C. The heated reducing gas stream 66, which will be recycled to the reduction zone 12, is combined with coke oven gas 68 which has been treated for minimizing its BTX and sulfur compounds content and is heated to a temperature between about 500° C. and 750° C. by contact with DRI 124 and 126 in any one of vessels 114 and 116. Optionally, a controlled amount of gas 70 containing molecular oxygen from a suitable source 72 is added to the combined stream 73 of recycled gas 66 and make-up/treated-COG gas 68. This gas 70 is preferably pure oxygen but also oxygen-enriched air can be used. The option of oxygen-enriched air however has the drawback that there is more nitrogen introduced to accumulate in the system due to the gas recycle to the reduction reactor 10.

In treating the coke oven gas before its introduction into the reducing gas circuit (to combine with the gas stream 66 effluent from heater 64), it is initially fed from source 80 through pipes having valves 83 and 85 as gas streams 82 and 84 respectively, and on into alternately operated heaters 90 and 92 of the regenerative type. Heaters 90 and 92 preferably are of the kind where, in a first stage of the operation cycle, a mass of refractory material 94 and 96 is heated by the combustion of a fuel 98 (which can be the reducing gas purge 38 withdrawn from the reduction circuit, with the necessary combustion air 100 and 102), and in a second stage of their operation cycle, the accumulated heat in the mass of refractory material 94 and 96 is transferred to the coke oven gas 82 and 84. This type of heater having refractory material is known in other industrial applications as "stoves" or "pebble heaters". Fumes from the combustion in the heaters 90 and 92 flow through pipes 110 & 112 (controlled by valves 111 & 113 and are expelled from the system through a suitable stack.

Regenerative heaters having two vessels connected in series instead of being connected in parallel can also be used. In this type of heater the refractory material is caused to flow from a vessel in the heating stage to another vessel in the heat-transfer stage, where the desired gas stream is heated, and then the cooled refractory material is recycled to the heating vessel where it is heated again by the combustion of a fuel and the operation cycle is repeated.

One of the important advantages of the present invention, by utilizing regenerative heaters for heating coke oven gas, is that if the heavier hydrocarbons, tar residues and/or other substances form carbon deposits on the refractory material, these deposits are eliminated during the heating stage of the operating cycle of said heaters by the high temperature combustion gases. In other words, the carbon deposits are burned when the combustion is made with an excess of air, and in this way the carbon deposits are eliminated as $CO_2$ and $H_2O$, thus the heaters are cleaned in each combustion stage of the operating cycle.

Although in a preferred embodiment of the invention, the heaters 90 and 92 are of the regenerative type, heaters with tubes can also be utilized effecting a periodic de-coking (elimination of carbon deposits in the tubes), depending on the rate of carbon accumulation.

Hydrocarbons contained in coke oven gas can be reformed to $H_2$ and CO, at least partially if steam 104 is added through pipes 106 and 108. The amount of steam fed with coke oven gas depends on the content of BTX and heavy hydrocarbons. Typically, the proportion would be between about 5 volume % and 20 volume % of the amount of coke oven gas to be heated and then passes alternately through the DRI (adsorbent) in vessels 114 and 116. The gas exits vessels 114 and 116, after its contact with DRI (or with an equivalent adsorbent) at high temperature, through pipes 134 and 136 provided with valves 135 and 137. Valves 83, 85, 99, 101, 103, 105, 107, 109, 111, 113, 135 and 137 make possible to selectively lead the coke oven gas, fuel gas, steam, combustion air and flue gases according to the stage of operating cycle which heaters 90 and 92 are undergoing, in a manner known in the art.

The hot coke oven gas at a temperature between about 500° C. and 750° C. in heaters 90 and 92, is caused to pass through vessels 114 and 116 through pipes 118 and 120 provided with valves 121 and 122 so that alternately, one of the vessels 114 or 116 is in a cycle of adsorption of sulfur compounds and destruction of BTX, and the other is the stage of change of adsorbent material.

The adsorbent material is preferably direct reduced iron (DRI) but other materials can be utilized, such as iron oxides, dolomite or alkali compounds. In the case of iron oxides, hydrogen contained in coke oven gas contacting oxides at high temperature will reduce said oxides to metallic iron and eventually a material similar to DRI will be obtained in vessels 114 and 116.

DRI has proved to have the adsorption capacity for sulfur compounds due to its high porosity and to its destructive action on hydrocarbons by cracking or reforming. Preferably, the according to the invention, DRI 124 and 126 produced in the reduction reactor 10 is utilized as adsorbent material and is charged in vessels 114 and 116 with a particle size between about 1 and 4 mm. However, DRI of larger or smaller particle size can be utilized with some variation in the operation costs due to the pressure drop in the bed of DRI, the adsorption effectiveness, and the amount of DRI necessary for a predetermined capacity of coke oven gas cleaning.

The present invention allows utilization of coke oven gas at a low cost for cleaning of sulfur and oils Since the DRI 124 and 126 used in vessels 114 and 116 will not be used for steelmaking, it can be saturated with sulfur compounds and can be changed with fresh DRI by diverting just a small amount of the DRI produced in the direct reduction plant. This amount of DRI for coke oven gas cleaning may be in the range of about 0.05% of the DRI production on average.

Preferably, the DRI to be utilized for coke oven gas cleaning is selected from the DRI having smaller particle size, which in some plants normally is screened from the DRI 65 produced and is separated from the DRI production as "fines".

Valves 121, 122, 129 and 131 allow alternation of operation cycles in vessels 114 and 116 containing DRI for treating coke oven gas, so that while one of the vessels is in operation, the other vessel is in the cycle of discharge of DRI saturated with sulfur and carbon and the charge of fresh DRI.

After treatment of coke oven gas in vessels 114 and 116, this treated COG 68 fed via pipes 128 and 130, provided with valves 129 and 131, is injected into the reducing gas stream 66 in the reducing gas circuit, to be used as a source of reducing gas in reactor 10 without the problems caused by BTX and sulfur compounds in piping and other gas handling equipment.

Figure 2:
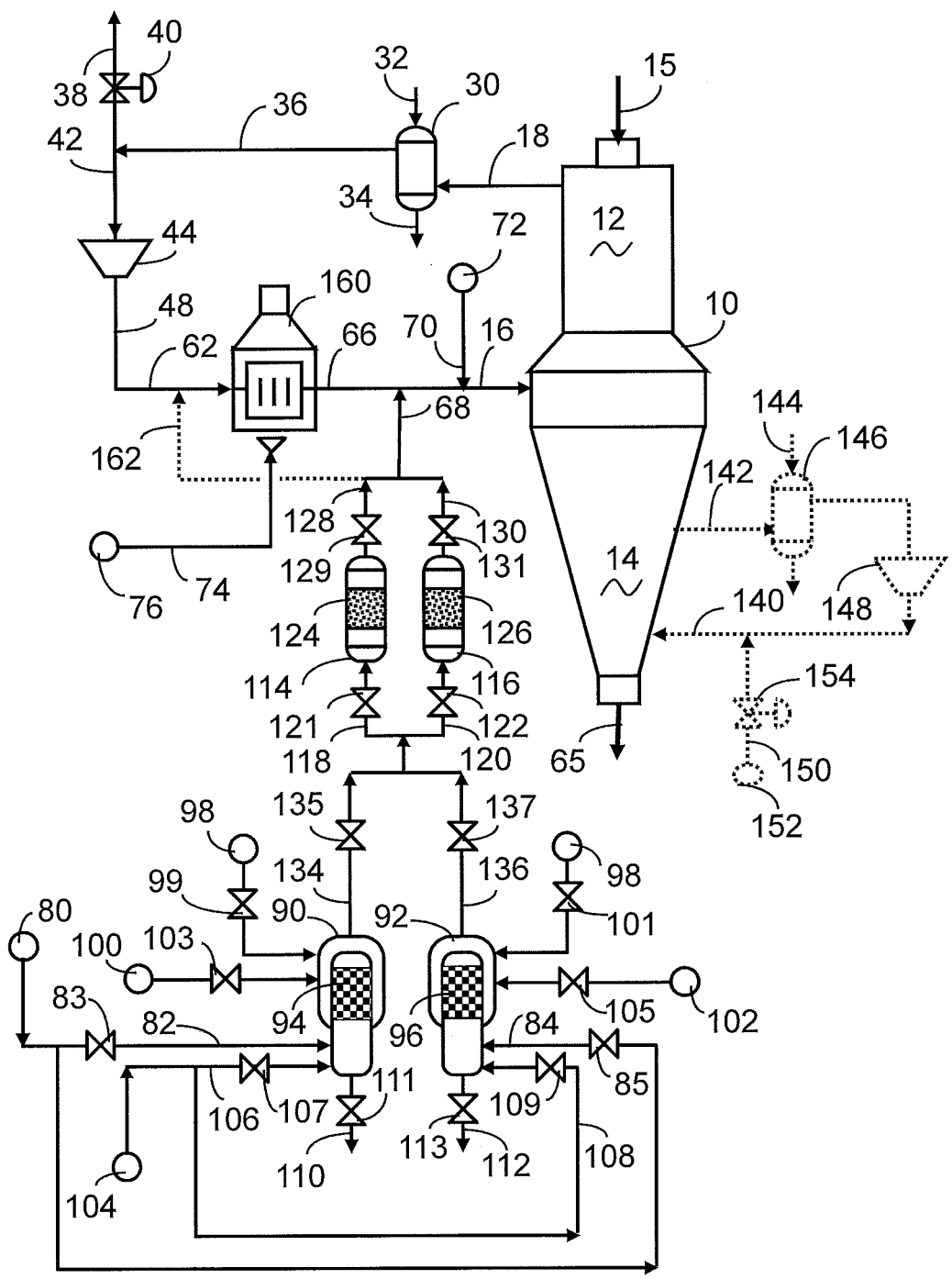
FIG. 2 is a schematic process diagram showing another embodiment of the invention as applied to a direct reduction process where the reducing gas withdrawn from the reduction reactor passes through a catalytic reformer for reforming hydrocarbons contained in the coke oven gas before the gas is fed to the reactor.
Figure 3:
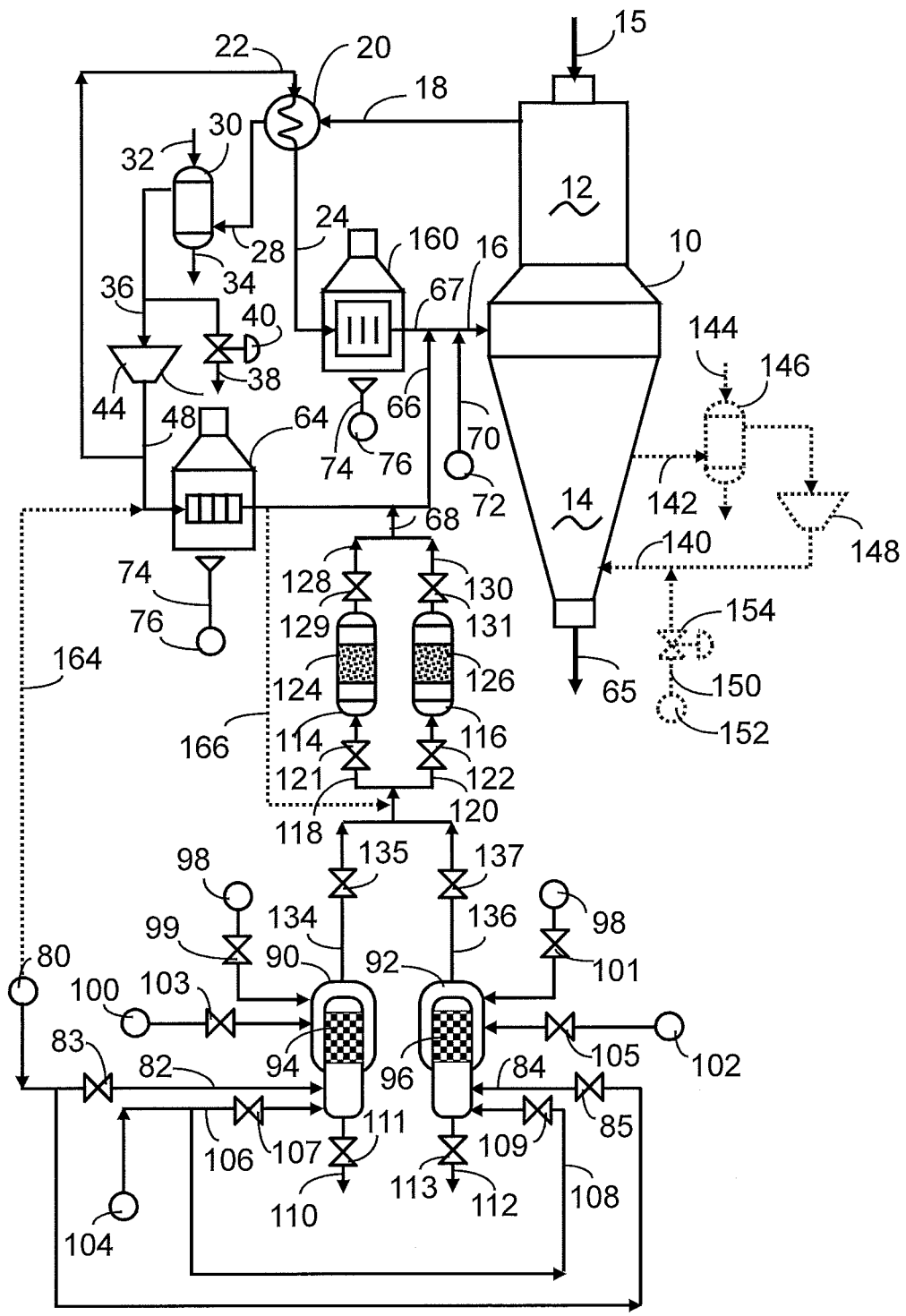
FIG. 3 is a schematic process diagram showing a further embodiment of the invention as applied to a direct reduction process where a portion of the reducing gas withdrawn from the reduction reactor passes through a catalytic reformer and another portion of the reducing gas withdrawn from said reactor is recycled to the reactor through a gas heater.

In the process diagrams shown in FIGS. 1, 2 and 3, the components of the DRI cooling circuit at the lower part of reactor 10, are shown with dotted lines to indicate that although preferably the invention is addressed to a process and apparatus for producing DRI at high temperatures, above about 500° C., some embodiments of the invention comprise a reduction reactor capable of producing DRI low temperature, when DRI cannot be utilized in a steelmaking plant immediately after its production. To this effect, a cooling gas 140 is circulated through the DRI bed in the lower zone 14 of the reactor, the heated cooling gas 142 is withdrawn from the reactor and is cooled with water 144 in cooler 146 and is recycled back to zone 14 by means of a compressor or equivalent equipment 148. A cooling gas stream 150 from a suitable source 152 is injected at a rate regulated by valve 154 to the cooling gas circuit as make-up of the gas lost from said circuit by reaction with DRI or which for any reason exits said gas circuit.

With reference to FIG. 2, where the numerals designate equivalent elements of the process and apparatus of FIG. 1, another embodiment of the invention is shown as applied to a direct reduction process where the reducing gas effluent from reactor 10, which is eventually recycled to said reactor, is caused to flow through a catalytic reformer 160 wherein the hydrocarbons present in the recycled gas and additional hydrocarbon make-up gas are reformed to $H_2$ and CO. Coke oven gas is treated in the same manner as described above with reference to FIG. 1 and is fed to the reducing gas circuit by its injection to the reducing gas circuit adding it to the reducing gas stream effluent from the reformer 160.

In a second embodiment of the invention, coke oven gas is treated in vessels 114 and 116 and thereafter is injected into the reducing gas circuit through pipe 162 before being fed to reformer 160.

In FIG. 3, a third embodiment of the invention is shown, as applied to a direct reduction process where a portion of the reducing gas withdrawn from the reduction reactor, which is recycled to reactor 10, is made to flow through catalytic reformer 160 and another portion of said gas is recycled to the reactor through a gas heater 64. Coke oven gas is treated in the same manner already described with reference to FIG. 1.

In a further embodiment of the invention, coke oven gas from source 80 is passed to a gas heater 64 via pipe 164 and after its combination with a gas stream 48, withdrawn from reduction zone 12, is then passed via pipe 166 on through a material capable of adsorbing sulfur-compounds in vessels 114 and 116 and then it is combined with a gas stream effluent 67 from the catalytic reformer 160.

It will be evident for those skilled in the art that numerous modifications to the embodiments of the invention herein described, as it may best fit the circumstances of a particular application, without departing from the spirit and scope of the invention, which is defined by the attached claims.

What is claimed is:

1. A direct reduction process for producing direct reduced iron (DRI) from particulate iron ores in the form of lumps, pellets or mixtures thereof, utilizing reducing gases produced from solid or liquid fossil fuels, in a reduction reactor having a reduction zone where the particles of iron ore are caused to react with a reducing gas fed to said reduction zone at a temperature in the range from 750° C. to 1100° C., characterized by:
heating a first gas stream derived from coal by means of regenerative heaters, where heat is transferred from a previously heated solid material to said gas produced from solid or liquid fossil fuels, at a temperature between 650° C. and 800° C.; causing the resulting hot first gas stream derived from coal to flow into contact with a bed of particles of a material adsorbent of sulfur compounds, outside of said reduction reactor, to form a second gas stream; combining said second gas stream with a third gas stream withdrawn from said reduction reactor from which $H_2O$ and $CO_2$ have at least partially been removed for regenerating its reducing potential, forming a fourth gas stream; and feeding said fourth gas stream to said reduction zone of the reduction reactor.

2. A direct reduction process according to claim 1, wherein said gas produced from solid or liquid fossil fuels is coke oven gas.

3. A direct reduction process according to claim 1, wherein said material adsorbent of sulfur-compounds is DRI.

4. A direct reduction process according to claim 1, wherein said material adsorbent of sulfur-compounds contains iron oxides.

5. A direct reduction process according to claim 1, wherein said material adsorbent of sulfur-compounds contains dolomite.

6. A direct reduction process according to claim 1, wherein said reducing gas fed to the reduction zone is formed by combination of a gas effluent from a catalytic reformer and a gas produced from coal which has been heated and treated by a sulfur-compounds adsorbent material.

7. A direct reduction process according to claim 6, wherein said gas produced from coal which has been heated and treated by a sulfur-compounds adsorbent material is combined with gas stream withdrawn from the reduction zone before being fed to the catalytic reformer.

8. A direct reduction process according to claim 1, wherein said reducing gas fed to the reduction zone comprises a combination of a gas stream effluent from a catalytic reformer, a gas stream produced from coal, which has been heated and treated by contact with a sulfur-compounds adsorbent material, and a gas stream withdrawn from the reduction zone heated to a temperature above 750° C.

9. A direct reduction process according to claim 8, wherein said gas stream withdrawn from the reduction zone is combined with a gas stream produced from coal, before it is treated by contact with said material adsorbent of sulfur-compounds, and after being treated by contact with said material adsorbent of sulfur-compounds is then combined with a gas stream effluent from the catalytic reformer.

10. A direct reduction process according to claim 1, wherein BTX contained in the gas stream produced from coal are destroyed by contacting said gas produced from coal with the sulfur-compounds adsorbent material.

11. A direct reduction process for producing direct reduced iron (DRI) from particulate iron ores in the form of lumps, pellets or mixtures thereof, utilizing reducing gases produced from solid or liquid fossil fuels, in a reduction reactor having a reduction zone where the particles of iron ore are caused to react with a reducing gas fed to said reduction zone at a temperature in the range from 750° C. to 1100° C., characterized by: heating a first gas stream derived from coal at a temperature between 650° C. and 800° C.; causing said hot gas derived from coal to flow into contact with a bed of DRI particles to adsorb sulfur compounds therefrom, outside of said reduction reactor, to form a second gas stream; combining said second gas stream with a third gas stream withdrawn from said reduction reactor from which $H_2O$ and $CO_2$ have at least partially been removed for regenerating its reducing potential, forming a fourth gas stream; and feeding said fourth gas stream to said reduction zone of the reduction reactor.

12. A direct reduction process according to claim 11, wherein said gas produced from solid or liquid fossil fuels is coke oven gas.

13. A direct reduction process according to claims 12, wherein BTX contained in the gas stream produced from coal are destroyed by contacting said gas produced from coal with bed of DRI.

14. A direct reduction process according to claim 11, wherein said reducing gas fed to the reduction zone is formed by combination of a gas effluent from a catalytic reformer and a gas produced from coal which has been heated and treated by a bed of DRI.

15. A direct reduction process according to claim 14, wherein said gas produced from coal which has been heated and treated by a bed of DRI is combined with gas stream withdrawn from the reduction zone before being fed to the catalytic reformer.

16. A direct reduction process according to claim 11, wherein said reducing gas fed to the reduction zone comprises a combination of a gas stream effluent from a catalytic reformer, a gas stream produced from coal, which has been heated and treated by contact with a bed of DRI, and a gas stream withdrawn from the reduction zone heated to a temperature above 750° C.

17. A direct reduction process according to claim 16, wherein said gas stream withdrawn from the reduction zone is combined with a gas stream produced from coal, before it is treated by contact with a bed of DRI, and after such treatment is combined with a gas stream effluent from the catalytic reformer.

18. A plant for producing direct reduced iron (DRI) from particulate iron ores in the form of lumps, pellets or mixtures thereof, comprising
a reduction reactor having a reduction zone where the particles or iron ore are caused to react with a reducing gas fed to said reduction zone at a temperature in the range from 750° C. to 1100° C.,
characterized by further comprising:
a plurality of gas heaters for heating a gas stream produced from coal at a temperature between 650° C. and 800° C.;
at least two vessels each containing a bed of particles of a material capable of adsorbing sulfur-compounds contained in said gas produced from coal and which operate alternating an adsorption cycle and a cycle for discharge and charge of said material;

joinder piping for combining flow from said two vessels with flow derived from said reactor so as to combine the gas produced from coal, free from sulfur-compounds, with a reducing gas stream withdrawn from the reduction reactor, from which $H_2O$ and $CO_2$ have been at least partially removed to regenerate its reducing potential; and feed piping for introducing at least the resulting combination of gases to the reduction zone of said reactor.

19. A plant for producing direct reduced iron (DRI) from particulate iron ores according to claim 18, further characterized by the fact that the gas heaters for heating said gas produced from coal are regenerative, where in alternate operation cycles, a refractory material accumulates heat produced by the combustion of a fuel in a first stage of the cycle and then this heat is transferred to said gas produced from coal in a second stage of the gas heating cycle.

20. A plant for producing direct reduced iron (DRI) from particulate iron ores according to claim 18, further characterized by the fact that the gas heaters for heating said gas produced from coal have heating tubes and direct fire, where in alternate operating cycles, said gas is heated in a heating stage and then said heating tubes are cleaned in a cleaning stage of the cycle to remove carbon deposits that may form therein.

21. A plant for producing direct reduced iron (DRI) from particulate iron ores according to claim 18, characterized by further comprising a catalytic reformer for reforming hydrocarbons present in said gas withdrawn from the reduction zone and in said gas produced from coal.

22. A plant for producing direct reduced iron (DRI) from particulate iron ores according to claim 21, characterized by further comprising a gas heater for heating a portion of the gas withdrawn from said reduction zone of the reactor, to a temperature above 750° C.

23. A plant for producing direct reduced iron (DRI) from particulate iron ores according to claim 18, characterized by the fact that said gas produced from coal is coke oven gas.

24. A plant for producing direct reduced iron (DRI) from particulate iron ores according to claim 18, characterized by the fact that said gas produced from coal is generated by partial combustion of coal.

25. A plant for producing reduced iron (DRI) from particulate iron ores according to claim 18, characterized by the fact that said sulfur-compounds adsorbent material is DRI.

26. A plant for producing direct reduced iron (DRI) from particulate iron ores according to claim 18, characterized by the fact that said sulfur-compounds adsorbent material contains iron oxides.

27. A plant for producing direct reduced iron (DRI) from particulate iron ores according to claim 18, characterized by the fact that said sulfur-compounds adsorbent material contains dolomite.

28. A plant for producing direct reduced iron (DRI) from particulate iron ores according to claim 18, characterized by said gas produced from coal contains BTX and said BTX are destroyed by treating said gas produced from coal with the sulfur-compounds adsorbent material.

* * * * *